United States Patent Office 3,740,367
Patented June 19, 1973

---

3,740,367
COLLOIDAL DISPERSIONS OF AMMONIA-COMMINUTED PARTICLES OF METHYL METHACRYLATE-ACID COPOLYMERS
Kermit W. Winkelblech, Wilmington, Del., assignor to E. I. du Pont de Nemours and Company, Wilmington, Del.
No Drawing. Continuation-in-part of application Ser. No. 715,560, Mar. 25, 1968, which is a continuation-in-part of application Ser. No. 446,692, Apr. 8, 1965, which in turn is a continuation-in-part of application Ser. No. 290,924, June 27, 1963, all now abandoned. This application Sept. 14, 1970, Ser. No. 72,124
Int. Cl. C08f 27/14, 47/16
U.S. Cl. 260—29.6 TA          10 Claims

ABSTRACT OF THE DISCLOSURE

Aqueous colloidal dispersions of solid particles of an interpolymer in which at least 95 percent by number of said particles have diameters of 0.1 to 0.01 micron, and said interploymer has a weight average molecular weight of at least 10,000 and consists essentially of 20–99 percent by weight of methyl methacrylate, 0–75 percent by weight of ester selected from the group consisting of alkyl acrylates having 4 to 16 carbon atoms and alkyl methacrylates having from 6 to 16 carbon atoms, 0–40 percent by weight of ethylenically unsaturated copolymerizable monomer selected from the group consisting of styrene, vinyl acetate, vinyl fluoride, vinyl chloride, vinylidene fluoride and vinylidene chloride, and acid selected from the group consisting of 1–8 percent by weight of acrylic acid, 1–8 percent by weight of methacrylic acid, 4–8 percent by weight of maleic acid, and 4–8 percent by weight of itaconic acid. These dispersions are prepared by adding to a mixture of water and solid particles of said interpolymer (a) 30–150 percent of the stoichiometric amount of ammonium hydroxide required to neutralize the acid present in said interpolymer and (b) when the second order transition temperature of the interploymer is above 35° C., an amount of up to 1 part per part by weight of said interpolymer, effective to render said interpolymer colloidally dispersible, of a liquid organic comminution agent which is capable of at least swelling the interpolymer particles and is inert toward the ammonium hydroxide, and vigorously agitating the resulting mixture at a temperature of 40–100° C. until a reduction in the size of the interpolymer particles takes place such that at least 95 percent by number of said particles have diameters of less than 0.1 micron.

CROSS-REFERENCES TO RELATED APPLICATIONS

This application is a continuation-in-part of application Ser. No. 715,560, filed Mar. 25, 1968, which in turn is a continuation-in-part of Ser. No. 446,692, filed Apr. 8, 1965, which in turn is a continuation-in-part of application Ser. No. 290,924, filed June 27, 1963 all said applications being now abandoned.

BACKGROUND OF THE INVENTION (1) Field of the invention

This invention relates to acrylic polymer compositions and more particularly to novel colloidal dispersions of interpolymers of methyl methacrylate and certain carboxylic acids.

(2) Description of the prior art

Solutions and dispersions of acrylic polymers are widely used as paints, lacquers and enamels to provide protective and decorative coatings for a variety of different types of substrates. The preparation of various polymers of methyl methacrylate to provide coatings which are hard, durable, abrasion-resistant and possess high gloss characteristics is familiar technology in the art. It is well known that polymers which have these itemized properties may be obtained by polymerizing methyl methacrylate either alone or with other familiar copolymerizable monomers which impart certain desired characteristics to the polymer but which do not deleteriously effect, to any substantial degree, the required hardness, durability, abrasion-resistance and gloss properties. It is known that such a polymer should contain a substantial amount of methyl methacrylate; and the polymer may also contain alkyl acrylates having from 4 to 16 carbon atoms and alkyl methacrylates having from 6 to 16 carbon atoms, and monomers such as monovinyl aromatic hydrocarbons, vinyl acetate, vinyl fluoride, vinyl chloride, vinylidene fluoride and vinylidene chloride; and the polymer may contain a carboxylic acid such as acrylic acid, methacrylic acid, maleic acid, and itaconic acid.

Solutions of polymers dissolved in various solvents are commonly used as lacquers and enamels. The polymers mentioned above are soluble in common solvents such as toluene, methyl ethyl ketone, and methyl isobutyl ketone. However, the solvents which dissolve these polymers are usually flammable and quite volatile, which creates hazards of potential fire and explosion, and furthermore, their vapors may be toxic. Moreover, since the viscosities of polymer solutions increase with increasing polymer concentration, to obtain a solution having a practical spraying viscosity, the concentration of the polymer, most often, is undesirably low. Because of this low polymer concentration it is usually necessary to apply more thane one layer to obtain an acceptable coating.

It has long been recognized that a water-based carrier or solvent system for use with the above-mentioned methyl methacrylate polymers would alleviate many of the problems inherent in the lacquers. Thus, there have been reported attempts to modify methyl methacrylate polymers to render them soluble in water, or at least soluble in water-based systems having an alkaline pH. This has most generally been accomplished by copolymerizing methyl methacrylate with relatively large amounts of a copolymerizable carboxylic acid such as acrylic acid or methacrylic acid.

It is known that a methyl methacrylate polymer containing more than 80% of such a carboxylic acid is completely water soluble. However, such a polymer has little utility as a protective coating because of its complete lack of resistance to water. A methyl methacrylate polymer containing from 25 to 80% by weight of such a carboxylic acid is soluble in virtually all of the common bases such as sodium hydroxide, potassium hydroxide, and the like. A methyl methacrylate polymer containing from about 8 to 25% of a carboxylic acid is soluble in ammonium hydroxide, i.e., is soluble in water as the ammonium salt of the polymer. However, these latter polymers are too sensitive to water and bases to be of any practical value as anything other than temporary coatings. Moreover, these polymers which contain more than about 8% of copolymerizable carboxylic acids may be undesirably brittle, since relatively large amounts of carboxylic acids raise the second order transition temperature and decrease the flexibility of the polymer. Where it is desired to provide a durable methyl methacrylate polymer coating, it is necessary to use a methyl methacrylate polymer which contains about 8% or less of a copolymerizable carboxylic acid.

Some of the problems inherent in polymer solutions are overcome by the use of an aqueous polymer dispersion (sometimes referred to as a latex); that is, an aqueous medium wherein discrete, relatively large, polymer particles are dispersed. One problem with aqueous dispersions stems from the fact that, to obtain a film-forming composition, the methyl methacrylate polymer which is dispersed in the aqueous medium must have a second order transition temperature of below the temperature of application (normally about 25° C.). Consequently, to prepare a film-forming aqueous dispersion of a polymer, the polymer itself must have a second order transition temperature of below 25° C., or if the polymer has a second order transition temperature of above 25° C., a plasticizer must be incorporated into the composition to obtain coalescence at the normal temperature of application. In either case, the resultant coating film tends to be undesirably soft and deficient in abrasion resistance, durability, and gloss. Furthermore, as a practical matter it is necessary to incorporate surfactants into such aqueous dispersions, and generally, this increases the water sensitivity of the resultant coating films. Also, many ordinary dispersions do not always effectively penetrate porous substrates such as wood, masonry, paper, and do not effectively "wet" substrates with irregular surfaces such as metals; thus, leading to unsatisfactory adhesion onto such substrates. The dispersions of the art often do not provide sufficient pigment binding ability to obtain adequate pigment concentration where substrate hiding properties are important. The brush leveling properties of the dispersions of the art are also usually unsatisfactory for most decorative coating purposes.

SUMMARY OF THE INVENTION

In accordance with the present invention there is provided an aqueous colloidal dispersion of particles of an interpolymer of monomers, said interpolymer comprising methyl methacrylate and an acid selected from the group consisting of 1–8% by weight acrylic acid, 1–8% by weight methacrylic acid, 4–8% by weight maleic acid, and 4–8% by weight itaconic acid, with at least about 30 mole percent of said acid being in the form of the ammonium salt, and at least about 95% by number of the said particles being within the size range of 0.01 to 0.1 micron in diameter.

DETAILED DESCRIPTION OF THE INVENTION

For many ultimate uses, such as coatings, it is essential that the colloidal dispersions of this invention be film-forming at room temperature. Accordingly, one species of this invention provides a unique film-forming colloidal dispersion. However, there are ultimate uses, such as textile sizing, which do not require a film-forming composition. Therefore, in its broadest scope, the present invention encompasses certain colloidal dispersions which are not film-forming, but which still possess unique properties heretofore unattained with the polymer solutions and ordinary dispersions of the art. Even so, it will be noted that all of these colloidal dispersions can be rendered film-forming by a convenient technique described in detail hereinafter. Thus, this invention provides the art with a new colloidal dispersion which can be produced by a manufacturer in a minimum number of varieties, but which can be conveniently formulated into infinite varieties of compositions by the users thereof to fit a multitude of specific end uses.

The colloidal dispersions of this invention possess a number of surprising properties, overcoming many of the deficiencies common to the polymer solutions and ordinary dispersions prepared heretofore. These colloidal dispersions do not possess the undesirable concentration-viscosity relationship typical of polymer solutions, and thus, may be formulated to relatively high polymer concentrations, of 40% to 50% by weight or more, and still retain practical sprayable viscosities. The film-forming colloidal dispersions of this invention provide hard, abrasion-resistant, durable, glossy (or semi-gloss, if desired) coating films. Surfactants are not required to maintain the stability of these colloidal dispersions; therefore, the resultant coating films are not water sensitive. It will be noted hereinafter, that in accordance with one possible method for preparing the colloidal dispersions of this invention, a surfactant is used in one of the intermediary steps. However, the amount of surfactant is so small that the highly desirable property of water-insensitivity is not adversely affected. These colloidal dispersions effectively penetrate porous substrates such as wood, masonry, paper, and effectively "wet" substrates having irregular surfaces such as metals. This particular property yields markedly improved adhesion compared to the ordinary dispersions of the art. A very surprising, and highly desirable, improvement over the ordinary dispersions of the art is the strikingly improved brush leveling properties of the colloidal dispersions of this invention. The viscosity-shear rate relationship of the unpigmented colloidal dispersions of this invention is identical to that of an unpigmented ordinary dispersion for any given polymer and polymer concentration. One skilled in the art would expect a similar behavior for pigmented compositions, and therefore, would expect that the pigmented colloidal dispersions of this invention would have about the same brush leveling properties as the pigmented ordinary dispersions of the art. Contrary to these expectations, it was discovered that pigmented compositions formulated from the colloidal dispersions of this invention have markedly improved brush leveling properties compared to the formulated dispersions of the art.

The polymers used in the practice of this invention are interpolymers of monomers which must contain two essential components: methyl methacrylate and a copolymerizable carboxylic acid selected from the group consisting of about 1–8% of acrylic acid, about 1–8% of methacrylic acid, about 4–8% of maleic acid, and about 4–8% of itaconic acid, and the interpolymer may also contain certain other components as described herein. In order to obtain the desired coating film properties of hardness, durability, abrasion-resistance, and gloss, it is necessary that the polymer contain at least 20% methyl methacrylate and preferably the polymer should contain at least 50% methyl methacrylate. Where the polymer is composed of only methyl methacrylate and a carboxylic acid, the methyl methacrylate content must be at least 92%.

In the final colloidal dispersion of this invention at least about 30 mole percent of the acid in the interpolymer is in the form of the ammonium salt.

The precise amount of carboxylic acid required in the polymer depends upon the particular polymer employed. Methyl methacrylate polymers containing more than about 8% carboxylic acid generally tend to be excessively water and base sensitive, and furthermore, tend to be undesirably brittle. These polymers are characterized as being soluble in ammonium hydroxide. The exact upper limit for the amount of carboxylic acid in the polymer which marks the dividing line between those polymers which are soluble in ammonium hydroxide and those polymers which are insoluble in ammonium hydroxide may actually vary from about 7.5% to about 8.5% depending upon the structure of the polymer. For example, the degree of homogeneity of the comonomer distribution in the polymer has a marked effect, particularly the homogeneity of the carboxylic acid distribution. That is, an interpolymer wherein the carboxylic acid groups are distributed relatively unevenly along the poymer chain, can tolerate a total larger amount of carboxylic acid without rendering the interpolymer ammonium hydroxide soluble, than can an interpolymer wherein the carboxylic acid groups are distributed relatively evenly along the polymer chain. Another factor is the presence of comonomers other than the carboxylic acids. That is, a polymer containing only methyl methacrylate and a carboxylic acid can tolerate a greater amount of the carboxylic acid than can a polymer which also contains polar comonomers such as ethyl acrylate and vinyl chloride. The lower limit for the amount of carboxylic acid depends primarily on the particular carboxylic acid employed. Polymers containing less than about 1% of either acrylic acid or methacrylic acid or less than about 4% of either maleic acid or itaconic acid are not colloidally dispersible in the liquid medium used in this invention. The polymer may contain more than one of the enumerated carboxylic acids provided that the total amount of the acids falls within the specified range of about 1–8%.

In the practice of this invention it is definitely preferred to use interpolymers which contain from 3 to 6% of acrylic acid or methacrylic acid or 4 to 6% of maleic acid or itaconic acid. In some instances, greater than 6% acid in the interpolymers tends to lead to some degree of water sensitivity. Less than the preferred amounts of acid can lead to difficulties in obtaining the required polymer particle size range. Consequently, since it is generally desired to use a liquid medium which is composed of as much water as is possible, it is desirable to use an interpolymer which contains the preferred amount of carboxylic acid.

As stated above, the interpolymer of this invention may be composed of solely methyl methacrylate and carboxylic acid, however, certain other comonomers may be included in the interpolymer. For example, the interpolymer may contain up to a total of 75% of one or more alkyl acrylate having from 4 to 16 carbon atoms and alkyl methacrylates having from 6 to 16 carbon atoms. Alkyl acrylates having from 4 to 16 carbon atoms include methyl acrylate, ethyl acrylate, isopropyl acrylate, n-butyl acrylate, isobutyl acrylate, n-amyl acrylate, isoamyl acrylate, n-hexyl acrylate, 2-ethyl hexyl acrylate, n-octyl acrylate, decyl acrylate, dodecyl acrylate, and substituted alkyl acrylates having halogen atoms on the alpha carbon atom, and the like. Alkyl methacrylates having from 6 to 16 carbon atoms include ethyl methacrylate, propyl methacrylate, n-butyl methacrylate, isobutyl methacrylate, n-amyl methacrylate, n-hexyl methacrylate, n-heptyl methacrylate, n-octyl methacrylate, 2-ethyl hexyl methacrylate, decyl methacrylate, dodecyl methacrylate, and the like. These alkyl acrylates and alkyl methacrylates are represented by the structural formula:

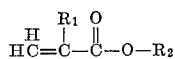

wherein $R_1$ is a member of the group consisting of hydrogen, a methyl group, and a halogen (i.e., chlorine, bromine, fluorine, or iodine), and $R_2$ is an alkyl group having from 2 to 12 carbon atoms when $R_1$ is a methyl group and having from 1 to 13 carbon atoms when $R_1$ is either hydrogen or a halogen.

Other known ethylenically unsaturated copolymerizable monomers may be incorporated into these interpolymers. Generally, these other copolymerizable monomers are used in amounts up to about 40%, based on the weight of the interpolymer. Suitable monomers include styrene, vinyl acetate, vinyl fluoride, vinyl chloride, vinylidene fluoride, vinylidene chloride, and the like.

The practitioner of this invention may use an interpolymer of virtually any molecular weight desired. However, the interpolymer particle size is related to the molecular weight of the interpolymer. It is sometimes difficult to obtain the required particle size with very high molecular weight interpolymers. For optimum properties, it is preferred to use an interpolymer having a weight average molecular weight of from 10,000 to 150,000.

The method of preparation of the interpolymer used in this invention is not critical. Thus, any of the well-known processes for the copolymerization of methyl methacrylate with copolymerizable carboxylic acids and other desired copolymerizable monomers may be employed. Details of such polymerization processes are provided in many references, including U.S. Pat. 1,933,052; U.S. Pat. 2,114,233; U.S. Pat. 2,117,321; U.S. Pat. 2,118,863; U.S. Pat. 3,057,812; and Schildknecht, Vinyl and Related Polymers, John Wiley & Sons, Inc., New York (1952), chapter IV. A convenient method of preparation of the composition of this invention, is to incorporate the interpolymer into the liquid medium in the physical form of relatively small particles. Therefore, if the interpolymer is prepared in bulk it is desirable to grind or powder the interpolymer before combining with the liquid medium. It is very convenient to prepare the interpolymer by a bead suspension or dispersion technique wherein water is the dispersing medium. By such a process, the interpolymer is obtained as relatively small particles or beads dispersed in water. The composition of this invention can then be prepared by incorporating into this water dispersion the other required components of the liquid medium, and then processing as described hereinafter.

While not all of the individual particles of these colloidal dispersions need to fall within the specified size range of 0.01 to 0.1 micron in diameter, it is critical that at least about 95% by number of the particles be within this range, in order to obtain the unique benefits provided by this invention. Particle size, and particle size distribution may be determined by visual examination of a prepared sample in an electron microscope or by inspection of electron photomicrographs obtained from such sample.

To obtain the required interpolymer particle size, it is critical that at least about 30 mole percent, or preferably about 45 to 85 mole percent, of the carboxylic acid present in the interpolymer be in the form of the ammonium salt. This is accomplished by reacting the interpolymer in a water medium with 30 to 150 mole percent, or preferably, 45 to 85 mole percent of the stoichiometric amount of ammonium hydroxide required to neutralize the acid present in the interpolymer. The viscosity of the composition of this invention is directly affected by the amount of ammonia present. Also, compositions containing large amounts of ammonia tend to give off objectionable ammonia fumes. Therefore, it is preferred to use minimal amounts of ammonia.

The colloidal dispersions of this invention must be prepared under certain critical process conditions. Merely combining the components will not produce the desired colloidal dispersion. First, the interpolymer is combined with water. Preferably, the interpolymer is in the form of finely divided particles, and also preferably, the interpolymer particles are dispersed in the water. This may be accomplished by conventional polymer dispersing techniques employing a preformed interpolymer and a commercial surfactant, or by initially preparing the interpolymer by one of the familiar suspension or emulsion polymerization methods. The ammonium hydroxide is then added to the liquid medium. The mixture of components is then vigorously agitated at an elevated temperature, on the order of 40° to 100° C., until the desired interpolymer particle size is obtained.

In most ultimate uses, it is desired to obtain a tough, abrasion resistant coating, or the like. This requires the use of an interpolymer having a relatively high second order transition temperature, frequently higher than 50° or 60° C. It has been discovered that to obtain a colloidal dispersion of an interpolymer having a second order transition temperature of at least 35° C., and sometimes even as low as 25° C., it is necessary to add a particular comminution agent to the liquid medium during the preparation thereof. It is preferable that this comminution agent be mixed into the liquid medium which contains the solid interpolymer particles, prior to the addition of the ammonium hydroxide. After the comminution agent is added to the liquid medium, and the ammonium hydroxide is added, the mixture of components is vigorously agitated at 40° to 100° C. for sufficient time to obtain the desired product.

To obtain a colloidal dispersion having an interpolymer content of greater than about 40% by weight, it is necessary to remove at least a portion of the residual ammonium hydroxide. This may be accomplished by either adding to the colloidal dispersion a substance that will chemically react with the ammonium hydroxide, or by evaporating a portion of the liquid medium in such a manner that a portion of the ammonium hydroxide is also evaporated.

The comminution agents suitable for use in this invention are characterized as being liquid organic compounds capable of at least swelling, if not dissolving, the particular interpolymer employed. Although the comminution agent need not be a complete solvent for the interpolymer, nor be water miscible, many of the preferred comminution agents are solvents for the interpolymer, and also, are water miscible. It is preferred to use a comminution agent that is inert towards the ammonium hydroxide used to neutralize the acid groups in the interpolymer.

The fact that such comminution agents function to promote size reduction of the interpolymer particles to within the colloidal range of 0.01 to 0.1 micron in diameter, under the process conditions of this invention, represents an unexpected result. Such compounds have been commonly added to ordinary dispersions of the art with no size reduction obtained. In fact, the usual result is an increase in particle size.

The comminution agent used in this process step is not required in the colloidal dispersion after the dispersion is prepared. Therefore, the comminution agent may be removed if desired. Where it is intended for the comminution agent to be removed, it is convenient to select a relatively volatile comminution agent which may be removed simply by heating. As discussed in detail hereinafter, it is sometimes desired to use a coalescing agent in the resulting colloidal dispersion which will tend to remain in a film cast from the dispersion to provide long term flexibility. Compounds which function as comminution agents also function as coalescing agents. Therefore, in such circumstances it is convenient to select a comminution agent having a relatively high boiling point, at least 100° C., which will remain in the colloidal dispersion throughout its processing steps and then be available to serve as a coalescing agent. Suitable comminution agents include the alcohols such as methanol, ethanol, n-propanol, isopropanol, n-butanol, sec.-butanol, tert.-butanol, isobutanol, diacetone alcohol, furfuryl alcohol, tetrahydrofurfuryl alcohol, 2-chloroethanol, 2-fluoroethanol, 1-chloro-2-propanol, and the like; the aldehydes and ketones such as acetaldehyde, acetone, acetonyl ketone, and the like; the glycols such as ethylene glycol, glycerol, glycidol, trimethylene glycol, 3-hydroxybutanol, trimethylethylene glycol, triethylene glycol, tetraethylene glycol, such as m-dioxane, p-dioxane, glycerol ether, glycerol monomethyl ether, ethylene glycol monoethyl ether, methylethylene glycol monoethyl ether, butylethylene glycol monoethyl ether, diethylene glycol monoethyl ether, methyldiethylene glycol monoethyl ether, diethyldiethylene glycol monoethyl ether, butyldiethylene glycol monoethyl ether, and the like. A mixture of two or more of such comminution agents may be used if desired.

Where a comminution agent is used, it is added in an effective amount, of up to 1 part per part by weight of interpolymer, to colloidally disperse the interpolymer; that is, to obtain interpolymer particles in the size range of 0.01 to 0.1 micron in diameter. The precise minimum amount of comminution agent that is required, depends on the particular interpolymer and the particular comminution agent used. If an insufficient amount of the comminution agent is used, the interpolymer will not be colloidally dispersed in the liquid medium, but will form a separate phase. Moreover, in some instances the precise maximum limit of comminution agent which may be actually tolerated in the liquid medium is somewhat less than 1 part per part by weight of interpolymer. This upper limit appears to be a function of the particular comminution agent and the particular interpolymer employed. The explanation for this phenomenon is not understood, but if this maximum amount is exceeded, the interpolymer will form a separate phase and will not be colloidally dispersed. Thus, it is stated that the comminution agent must be used in the liquid medium in an effective amount to render the interpolymer colloidally dispersible.

Colloidal dispersions of this invention containing interpolymers having second order transition temperatures below about 25° C. are film-forming at room temperature without the addition of coalescing agents. The use of interpolymers having second order transition temperatures higher than about 25° C., which includes those interpolymers which provide tough abrasion resistant coatings, produce colloidal dispersions which are not film forming at room temperature. Where this property is desired, it is necessary to incorporate a coalescing agent into the colloidal dispersion. The coalescing agents used in the practice of this invention possess the same characteristics as do the comminution agents described above, which are used in some instances to colloidally disperse interpolymers in the production of the colloidal dispersions of this invention. Thus, these coalescing agents are liquid organic compounds capable of at least swelling the particular interpolymer employed to promote coalescence of the interpolymer particles. Many of the preferred coalescing agents are solvents for the interpolymer, and also, are water miscible. It is generally preferred to use a coalescing agent which does not have an objectionable odor. Furthermore, it is preferred to use a coalescing agent which has a relatively high boiling point, i.e., at least 100° C., to insure that it will not flash off when the colloidal dispersion is applied as a coating. Also, it is preferred to use a coalescing agent that is inert towards the base used to neutralize the acid groups in the interpolymer.

While any of the compounds listed hereinbefore as suitable comminution agents for use to colloidally disperse the interpolymer are suitable for use as coalescing agents, the preferred properties are best optimized with the glycol ethers, particularly, ethylene glycol monoethyl ether, diethylene glycol monoethylene ether, and derivatives thereof.

Colloidal dispersions of this invention may be used "as is" for textile sizing purposes, or to provide clear protective coatings for metal, wood or other types of substrate. The composition of this invention may be used to prepare paints or enamels, as is familiar in the paint art, by incorporating therein suitable ingredients commonly used in paints such as pigments, pigment extenders including talc, mica, calcium carbonate, and clays; pigment dispersing agents such as potassium tripolyphosphate; antifoam agents; mildew inhibitors; and thickening agents such as casein, polyvinyl alcohol, hydroxyethyl cellulose and carboxymethyl cellulose. One class of thickening agents which are particularly useful in the preparation of semi-gloss enamels are polyoxyethylated $C_{10}$–$C_{20}$ alcohol partial esters of methyl vinyl ether/maleic anhydride copolymers wherein the alcohol is polyoxyethylated in mole ratios of 1:6 to 1:35 (ratio of ethylene oxide units to alcohol), the mole ratio of methyl vinyl ether to maleic anhydride in the copolymer is about 0.5:1 to 1:1.5, the weight ratio of alcohol to copolymer is 1:1 to 1:5 and the weight average molecular weight of the copolymer is 20,000 to 1,500,000. These particular agents are dissolved in aqueous media containing a base such as potassium, sodium, or ammonium hydroxide. A preferred thickening agent from this class is a polyoxyethylated lauryl alcohol partial ester of a methyl vinyl ether/maleic anhydride copolymer wherein the alcohol is polyoxyethylated in a mole ratio of 1:16, the mole ratio of methyl vinyl ether to maleic anhydride in the copolymer is 1:1, the weight ratio of alcohol to copolymer is 1:2 and the molecular weight of the copolymer is about 250,000.

EXAMPLES OF THE INVENTION

This invention is illustrated by the following examples wherein percentages and parts are in terms of weight unless otherwise stated. Molecular weights are in terms of weight average molecular weight. The term "colloidal"

dispersion as used in these examples refers to a dispersion wherein 95% of the particles have diameters within the range of 0.01 to 0.1 micron.

EXAMPLE 1

This example illustrates the preparation of a colloidal dispersion of this invention from an interpolymer prepared by suspension polymerization. 17,150 grams of water were added to a stainless steel vessel and agitation was begun. 50 grams of starch (American Maize Products Co. grade 80–TB) was then added, the system was heated to 90° C. for 15 minutes and cooled to room temperature. 4200 grams ethyl acrylate, 9500 grams methyl methacrylate. 40 grams of n-butyl mercaptan and 700 grams of methacrylic acid were then added in the order given. The vapor space above the reactants was evacuated and the reactants were heated to 96° C. Addition of a solution of 47.3 grams of azoisobutyronitrile in 1000 cc. of methanol was begun at a rate of 12 cc./min. when the temperature reached 90° C. Addition of catalyst solution was continued at this rate for 52 minutes. When the reaction temperature dropped to 82° C. and additional 115 cc. of catalyst solution was added. A temperature peak was reached 2–3 minutes following this addition and the batch was allowed to cool. The finely divided interpolymer product was isolated, washed with water and dried overnight at 60° C. 158.5 grams of the dried product was placed in a 2 liter vessel equipped with an agitator and 245 grams water followed by 45.3 grams of diethylene glycol monoethyl ether and 4.4 grams of concentrated (28%) ammonium hydroxide was added. The vessel was brought to 70° C. and the contents were agitated vigorously for 5½ hours. Upon cooling, and filtering, the clear bluish dispersion had a viscosity of 315 cps. (25° C.) and the dispersed particles had a diameters ranging from approximately 0.02 to 0.08 micron.

EXAMPLE 2

This example illustrates the preparation of a colloidal dispersion of this invention from an interpolymer prepared by emulsion polymerization. Into a vessel equipped with an agitator and reflux condenser was placed 102.7 parts of water and 0.0681 part of sodium lauryl sulfate. Agitation was begun and the vessel heated to 84° C., after which a previously prepared solution of 0.205 part ammonium persulfate in 5 parts of water were added. Continuous addition of the following monomer and surfactant solutions was then begun at rates such that complete addition of both solutions was achieved in 50 minutes; during which time the reaction was maintained at approximately 90° C.

Monomer solution

| | Parts |
|---|---|
| Methyl methacrylate | 65.1 |
| Ethyl acrylate | 28.6 |
| Methacrylic acid | 4.93 |
| n-Butyl mercaptan | 0.365 |

Surfactant solution

| | Parts |
|---|---|
| Sodium lauryl sulfate | 0.519 |
| Water | 16.1 |

A solution of 0.0968 part of ammonium persulfate in 1.42 parts water was then added and the temperature was maintained at 80–84° C. for 30 minutes. Upon cooling, the product was a white emulsion containing only a trace of coagulated polymer. The dispersed polymer particles had diameters in the range of 0.09–0.22 micron. The emulsion was found to contain 42.7% polymer solids in which the copolymerized methacrylic acid content was 5.02%.

100 parts of the emulsion product was charged to a vessel containing an efficient agitator, and heated to 70° C. with mild agitation. A solution containing 4.30 parts diethylene glycol monoethyl ether, 7.95 parts isopropyl alcohol and 7.10 parts water were added and agitation was continued for 10 minutes. A solution of 1.08 parts of concentrated (28%) aqueous ammonium hydroxide in 2.73 parts of water was then added over a 5 minute period. Agitator speed was increased and vigorous agitation was continued for 1 hour. The cooled product was a semi-transparent dispersion with a faint yellow color when viewed with transmitted light. It contained 34.2% solids and had a viscosity of 370 cps. (25° C.). The dispersed particles had diameters of 0.03–0.06 micron. Since there was no overlap in the size range of the particles before the comminution step (0.09–0.22 micron) as compared with the size range of the particles after the comminution step (0.03–0.06 micron), substantially 100 percent of the particles underwent a reduction in size.

EXAMPLE 3

This example demonstrates the preparation of a relatively high solids dispersion from a lower solids dispersion by evaporation of a portion of the aqueous solvent. An interpolymer dispersion prepared as described in Example 2 contained 36.0% polymer solids, a pH of 7.94 and a viscosity of 4400 cps. The dispersed particles had diameters of approximately 0.03 to 0.08 micron. The dispersion was transferred to a large round bottom flask which was placed in a hot water bath at 80° C. and rotated about its axis in such a manner that the dispersion formed a thin mobile film over most of the inside surface. Nitrogen was passed over this surface until sufficient solvent had been removed to increase the polymer solids level of the dispersion to 44.8%. The dispersion had a pH of 7.39, a viscosity of 540 cps. and the dispersed particles contained therein had diameters of from 0.03 to 0.10 micron.

EXAMPLE 4

This example demonstrates the preparation of a dispersion in which an amine reactive compound is added to the dispersion to react with a portion of the ammonia which was used in preparing the dispersion. An interpolymer prepared by emulsion polymerization by a method similar to that given in Example 2 contained 4.71% copolymerized methacrylic acid and 50.3% interpolymer solids. With mild agitation, 26.5 parts of hexylene glycol in 5 parts of water were added to 368 parts of emulsion and the material was heated to 70° C. 5.0 parts of concentrated (28%) ammonium hydroxide in 6.0 parts water were then added over a 30 minute period and the stirring rate was increased. The temperature was raised to 76° C. and agitation was continued for 4 hours during which time 19 parts of water were added. 10 parts of 2% formaldehyde and 7 parts of water were then added over a 50 minute interval. Upon cooling, the product was found to be a very viscous gel-like dispersion. It was reheated to 67° C. and an additional 5 grams of 2% formaldehyde solution were added. After stirring vigorously for 1 hour, the product was cooled. The dispersion was very fluid, having a viscosity of 340 cps. and a pH of 7.9. It contained 40.3% of interpolymer solid which was dispersed in particles having diameters of 0.03–0.09 micron.

In all of the following examples, the apparatus used was a 500 ml. flask fitted with a driven stirrer, reflux condenser and thermometer. The flask was partially immersed in a 70° C. water bath. In each example the interpolymer was prepared by a standard suspension polymerization method. The charge, consisting of the interpolymer and the liquid components shown, were introduced into the flask and then agitated as described.

Examples 5–6 demonstrate the colloidal dispersibility characteristics of various relatively hard interpolymers containing solely methyl methacrylate and methacrylic acid, and the criticality of using ammonium hydroxide and a plasticizer in the liquid medium.

EXAMPLE 5

In this example the interpolymer contained 92% methyl methacrylate (abbreviated hereinafter as "MMA"), 8% methacrylic acid (MAA), and had a molecular weight of 55,000.

Part A

Charge:

| | Grams |
|---|---|
| MMA/MAA interpolymer | 30 |
| Water | 130 |
| Ammonium hydroxide (30% ammonia) | 40 |

This mixture was agitated for approximately two hours at 70° C. At the end of this time, the discrete polymer beads remained substantially unchanged.

Part B

Charge:

| | Grams |
|---|---|
| MMA/MAA interpolymer | 30 |
| Water | 70 |
| Ethanol | 100 |

After agitating this mixture for two hours at 70° C., an apparent clear solution was obtained. Upon cooling to 25° C. agglomerated mass of polymer precipitated from the composition.

Part C

Charge:

| | Grams |
|---|---|
| MMA/MAA interpolymer | 30 |
| Water | 144 |
| Ethanol | 20 |
| Ammonium hydroxide (30% ammonia) | 6 |

After agitating this mixture for approximately 30 minutes at 70° C., a clear colloidal dispersion was obtained. This solution remained stable and exhibited a viscosity of 8.7 centipoises (cp.) at 25° C. This colloidal dispersion coalesced to form a continuous film when cast on a substrate at 25° C.

EXAMPLE 6

In this example the interpolymer contained 98% methyl methacrylate, 2% methacrylic acid, and had a molecular weight of 60,000.

Part A

Charge:

| | Grams |
|---|---|
| MMA/MAA interpolymer | 30 |
| Water | 130 |
| Ammonium hydroxide (30% ammonia) | 40 |

This mixture was agitated for two hours at 70° C. At the end of this time, the polymer beads were not colloidally dispersed.

Part B

Charge:

| | Grams |
|---|---|
| MMA/MAA interpolymer | 30 |
| Water | 70 |
| Ethanol | 100 |

This mixture was agitated for two hours at 70° C. At the end of this time the flask contained a separate liquid phase and an agglomerated mass of polymer.

Part C

Charge:

| | Grams |
|---|---|
| MMA/MAA interpolymer | 30 |
| Water | 144 |
| Ammonium hydroxide (30% ammonia) | 6 |
| Ethanol | 20 |

After agitating this mixture for 30 minutes at 70° C., a stable colloidal dispersion was obtained having a viscosity of 9.7 cp. at 25° C. This colloidal dispersion coalesced to form a continuous film when cast on a substrate at 25° C.

EXAMPLE 7

In this example, which is not within the scope of the invention, the interpolymer contained 99.5% methyl methacrylate, 0.5% methacrylic acid, and had a molecular weight of 60,000.

Charge:

| | Grams |
|---|---|
| MMA/MAA interpolymer | 30 |
| Water | 144 |
| Ammonium hydroxide (30% ammonia) | 6 |
| Ethanol | 20 |

This mixture was agitated for two hours at 70° C. At the end of this time the flask contained an agglomerated mass of polymer separate from the liquid phase.

Examples 8–13 demonstrate the colloidal dispersibility characteristics of various interpolymers containing as the sole two constituents, methyl methacrylate and one of the following carboxylic acids: acrylic acid, maleic acid, and itaconic acid.

EXAMPLE 8

In this example, the interpolymer contained 94% methyl methacrylate, 6% acrylic acid ("AA"), and had a molecular weight of 45,000.

Charge:

| | Grams |
|---|---|
| MMA/AA interpolymer | 30 |
| Water | 104 |
| Ammonium hydroxide (30% ammonia) | 6 |
| Ethanol | 60 |

After agitating this mixture for 30 minutes at 70° C., a stable colloidal dispersion was obtained having a viscosity of 15.2 cp. at 25° C. This colloidal dispersion coalesced to form a continuous film when cast on a substrate at 25° C.

EXAMPLE 9

In this example, the interpolymer contained 97% methyl methacrylate, 3% acrylic acid, and had a molecular weight of 45,000.

Charge:

| | Grams |
|---|---|
| MMA/AA interpolymer | 30 |
| Water | 104 |
| Ammonium hydroxide (30% ammonia) | 6 |
| Ethanol | 60 |

After agitating this mixture for 30 minutes at 70° C., a stable colloidal dispersion was obtained having a viscosity of 9.6 cp. at 25° C. This colloidal dispersion coalesced to form a continuous film when cast on a substrate at 25° C.

EXAMPLE 10

In this example, which is not within the scope of the invention, the interpolymer contained 99.5% methyl methacrylate, 0.5% acrylic acid, and had a molecular weight of 45,000.

Charge:

| | Grams |
|---|---|
| MMA/AA interpolymer | 30 |
| Water | 104 |
| Ammonium hydroxide (30% ammonia) | 6 |
| Ethanol | 60 |

After agitating this mixture for two hours at 70° C. the interpolymer remained substantially unchanged.

EXAMPLE 11

In this example, the interpolymer contained 95% methyl methacrylate, 5% itaconic acid ("IA"), and had a molecular weight of 45,000.

Charge:

| | Grams |
|---|---|
| MMA/IA interpolymer | 30 |
| Water | 104 |
| Ammonium hydroxide (30% ammonia) | 6 |
| Ethanol | 60 |

After agitating this mixture for approximately 30 minutes at 70° C., a stable colloidal dispersion was obtained having a viscosity of 14.2 cp. at 25° C. This colloidal dispersion coalesced to form a continuous film when cast on a substrate at 25° C.

EXAMPLE 12

In this example, which is not within the scope of this invention, the interpolymer contained 98% methyl methacrylate, 2% itaconic acid, and had a molecular weight of 40,000.

Charge: Grams
- MMA/IA interpolymer _____ 30
- Water _____ 104
- Ammonium hydroxide (30% ammonia) _____ 6
- Ethanol _____ 60

This mixture was agitated for approximately two hours at 70° C. At the end of this time, the polymer remained as an agglomerated mass in the bottom of the flask.

EXAMPLE 13

In this example the interpolymer contained 95% methyl methacrylate, 5% maleic acid ("MalA"), and had a molecular weight of 30,000.

Charge: Grams
- MMA/MalA interpolymer _____ 30
- Water _____ 104
- Ammonium hydroxide (30% ammonia) _____ 6
- Ethanol _____ 60

After agitating this mixture for 30 minutes at 70° C., a stable colloidal dispersion was obtained having a viscosity of 12.1 cp. at 25° C. This colloidal dispersion coalesced to form a continuous film when cast on a substrate at 25° C.

Examples 14–22 demonstrate colloidal dispersibility characteristics and use of various interpolymers of methyl methacrylate and methacrylic acid containing additional copolymerizable monomers.

EXAMPLE 14

In this example, the interpolymer contained 58.5% methyl methacrylate, 40% ethyl acrylate ("EA"), 1.5% methacrylic acid, and had a molecular weight of 40,000.

Part A

Charge: Grams
- MMA/EA/MAA interpolymer _____ 30
- Water _____ 130
- Ammonium hydroxide (32% ammonia) _____ 40

This mixture was agitated for two hours at 70° C. At the end of this time, the mixture contained the unchanged polymer particles.

Part B

Charge: Grams
- MMA/EA/MAA interpolymer _____ 30
- Water _____ 70
- Ethanol _____ 100

This mixture was agitated for two hours at 70° C. At the end of this time, the flask contained a separate liquid phase and an agglomerated mass of polymer.

Part C

Charge: Grams
- MMA/EA/MAA interpolymer _____ 30
- Water _____ 104
- Ammonium hydroxide (30% ammonia) _____ 6
- Ethanol _____ 60

After agitating this mixture for 30 minutes at 70° C., a stable colloidal dispersion was obtained having a viscosity of 7.1 cp. at 25° C. This colloidal dispersion coalesced to form a continuous film when cast on a substrate at 25° C.

EXAMPLE 15

In this example, the interpolymer contained 88.5% methyl methacrylate, 10% ethyl acrylate, 1.5% methacrylic acid, and had a molecular weight of 65,000.

Charge: Grams
- MMA/EA/MAA interpolymer _____ 30
- Water _____ 104
- Ammonium hydroxide (32% ammonia) _____ 6
- Ethanol _____ 60

After agitating this mixture for 30 minutes at 70° C., a stable colloidal dispersion was obtained having a viscosity of 8.9 cp. at 25° C. This colloidal dispersion coalesced to form a continuous film when cast on a substrate at 25° C.

EXAMPLE 16

In this example, the interpolymer contained 88.5% methyl methacrylate, 10% n-butyl acrylate ("BA"), 1.5% methacrylic acid, and had a molecular weight of 60,000.

Part A

Charge: Grams
- MMA/BA/MAA interpolymer _____ 30
- Water _____ 130
- Ammonium hydroxide (32% ammonia) _____ 40

After agitating this mixture for two hours at 70° C., the polymer particles remained virtually unchanged.

Part B

Charge: Grams
- MMA/BA/MAA interpolymer _____ 30
- Water _____ 70
- Ethanol _____ 100

This mixture was agitated for two hours at 70° C. At the end of this time the flask contained a separate liquid phase and an agglomerated mass of polymer.

Part C

Charge: Grams
- MMA/BA/MAA interpolymer _____ 30
- Water _____ 104
- Ammonium hydroxide (32% ammonia) _____ 6
- Ethanol _____ 60

After agitating this mixture for 30 minutes at 70° C., a stable colloidal dispersion was obtained having a viscosity of 8.5 cp. at 25° C. This colloidal dispersion coalesced to form a continuous film when cast on a substrate at 25° C.

EXAMPLE 17

In this example, the interpolymer contained 88.5% methyl methacrylate, 10% n-butyl methacrylate, 1.5% methacrylic acid, and had a molecular weight of 45,000.

Charge: Grams
- MMA/BMA/MAA interpolymer _____ 30
- Water _____ 104
- Ammonium hydroxide (32% ammonia) _____ 6
- Ethanol _____ 60

After agitating this mixture for 30 minutes at 70° C., a stable colloidal dispersion was obtained having a viscosity of 8.5 cp. at 25° C. This colloidal dispersion coalesced to form a continuous film when cast on a substrate at 25° C.

EXAMPLE 18

In this example, the interpolymer contained 55% methyl methacrylate, 40% n-butyl methacrylate, 5% methacrylic acid, and had a molecular weight of 70,000.

Charge: Grams
- MMA/BMA/MAA interpolymer _____ 30
- Water _____ 104
- Ammonium hydroxide (30% ammonia) _____ 6
- Ethanol _____ 60

After agitating this mixture for 30 minutes at 70° C., a stable colloidal dispersion was obtained having a viscosity of 14.6 cp. at 25° C. This colloidal dispersion coalesced to form a continuous film when cast on a substrate at 25° C.

EXAMPLE 19

In this example, the interpolymer contained 88.5% methyl methacrylate, 10% 2-ethylhexyl acrylate ("2-EHA"), 1.5% methacrylic acid, and had a molecular weight of 80,000.

Charge: Grams
  MMA/2-EHA/MAA interpolymer _____ 30
  Water _____ 104
  Ammonium hydroxide (30% ammonia) _____ 6
  Ethanol _____ 60

After agitating this mixture for 30 minutes at 70° C., a stable colloidal dispersion was obtained having a viscosity of 7.0 cp. at 25° C. This colloidal dispersion coalesced to form a continuous film when cast on a substrate at 25° C.

EXAMPLE 20

In this example, the interpolymer contained 71% methyl methacrylate, 25% styrene ("Sty"), 4% methacrylic acid, and had a molecular weight of 32,000.

Charge: Grams
  MMA/Sty/MAA interpolymer _____ 30
  Water _____ 104
  Ammonium hydroxide (30% ammonia) _____ 6
  Ethanol _____ 60

After agitating this mixture for 30 minutes at 70° C., a stable colloidal dispersion was obtained having a viscosity of 12.1 cp. at 25° C. This colloidal dispersion coalesced to form a continuous film when cast on a substrate at 25° C.

EXAMPLE 21

In this example, the interpolymer contained 71% methyl methacrylate, 25% vinyl acetate ("VAc"), 4% methacrylic acid, and had a molecular weight of 45,000.

Charge: Grams
  MMA/VAc/MAA interpolymer _____ 30
  Water _____ 104
  Ammonium hydroxide (30% ammonia) _____ 6
  Ethanol _____ 60

After agitating this mixture for 30 minutes at 70° C., a stable colloidal dispersion was obtained having a viscosity of 9.2 cp. at 25° C. This colloidal dispersion coalesces to form a continuous film when cast on a substrate at 25° C.

EXAMPLE 22

In this example, the interpolymer contained 81% methyl methacrylate, 15% vinyl chloride ("VCl"), 4% methacrylic acid, and had a molecular weight of 65,000.

Charge: Grams
  MMA/VCl/MAA interpolymer _____ 30
  Water _____ 104
  Ammonium hydroxide (30% ammonia) _____ 6
  Ethanol _____ 60

After agitating this mixture for 30 minutes at 70° C., a stable colloidal dispersion was obtained having a viscosity of 10.6 cp. at 25° C. This colloidal dispersion coalesced to form a continuous film when cast on a substrate at 25° C.

Examples 23-27 demonstrate the use and effect of various plasticizers other than ethanol. In each of these following examples the interpolymer contained 97% methyl methacrylate, 3% methacrylic acid, and had a molecular weight of 45,000.

EXAMPLE 23

Charge: Grams
  MMA/MAA interpolymer _____ 30
  Water _____ 104
  Ammonium hydroxide (30% ammonia) _____ 6
  Methanol _____ 60

After agitating this mixture for 30 minutes at 70° C., a stable colloidal dispersion was obtained having a viscosity of 8.0 cp. at 25° C. This colloidal dispersion coalesced to form a continuous film when cast on a substrate at 25° C.

EXAMPLE 24

Charge: Grams
  MMA/MAA interpolymer _____ 30
  Water _____ 104
  Ammonium hydroxide (30% ammonia) _____ 6
  Propanol _____ 60

After agitating this mixture for 30 minutes at 70° C., a stable colloidal dispersion was obtained having a viscosity of 42.4 cp. at 25° C. This colloidal dispersion coalesced to form a continuous film when cast on a substrate at 25° C.

EXAMPLE 25

Charge: Grams
  MMA/MAA interpolymer _____ 30
  Water _____ 104
  Ammonium hydroxide (30% ammonia) _____ 6
  Isopropanol _____ 60

After agitating this mixture for 30 minutes at 70° C., a stable colloidal dispersion was obtained having a viscosity of 32.3 cp. at 25° C. This colloidal dispersion coalesced to form a continuous film when cast on a substrate at 25° C.

EXAMPLE 26

Charge: Grams
  MMA/MAA interpolymer _____ 30
  Water _____ 104
  Ammonium hydroxide (30% ammonia) _____ 6
  n-Butanol _____ 60

After agitating this mixture for 30 minutes at 70° C., a stable colloidal dispersion was obtained having a viscosity of 45.1 cp. at 25° C.

EXAMPLE 27

Charge: Grams
  MMA/MAA interpolymer _____ 30
  Water _____ 104
  Ammonium hydroxide (30% ammonia) _____ 6
  Isobutanol _____ 60

After agitating this mixture for 30 minutes at 70° C., a stable colloidal dispersion was obtained having a viscosity of 43.0 cp. at 25° C. This colloidal dispersion coalesced to form a continuous film when cast on a substrate at 25° C.

This invention has been described in considerable detail. Obviously, many variations in these details can be made without departing from the spirit and scope of this invention. Accordingly, it is to be understood that this invention is not to be limited except as defined by the appended claims.

I claim:
1. An aqueous colloidal dispersion of solid particles of an interpolymer in which at least 95 percent by number of said particles have diameters of less than 0.1 micron, said interpolymer has a weight average molecular weight of at least 10,000 and is selected from the group consisting of
   (1) copolymers consisting essentially of
      (a) 92–99% by weight of methyl methacrylate, and
      (b) acid selected from the group consisting of 1–8% by weight of acrylic acid, 1–8% by weight of methacrylic acid, 4–8% by weight of maleic, and 4–8% by weight of itaconic acid,

(2) interpolymers consisting essentially of
   (a) at least 20% by weight of methyl methacrylate,
   (b) up to 75% by weight of ester selected from the group consisting of alkyl acrylates having from 4 to 16 carbon atoms and alkyl methacrylates having from 6 to 16 carbon atoms, and
   (c) acid selected from the group consisting 1-8% by weight of acrylic acid, 1-8% by weight of methacrylic acid, 4-8% by weight of maleic acid, and 4-8% by weight of itaconic acid,
(3) interpolymers consisting essentially of
   (a) at least 55% by weight of methyl methacrylate,
   (b) up to 40% by weight of ethylenically unsaturated copolymerizable monomer selected from the group consisting of styrene, vinyl acetate, vinyl fluoride, and vinylidene chloride, and
   (c) acid selected from the group consisting of 1-8% by weight of acrylic acid, 1-8% by weight of methacrylic acid, 4-8% by weight of maleic acid, and 4-8% by weight of itaconic acid, and
(4) interpolymers consisting essentially of
   (a) at least 20% by weight of methyl methacrylate,
   (b) up to 75% by weight of ester selected from the group consisting of alkyl acrylates having from 4 to 16 carbon atoms and alkyl methacrylates having from 6 to 16 carbon atoms,
   (c) up to 40% by weight of ethylenically unsaturated copolymerizable monomer selected from the group consisting of styrene, vinyl acetate, vinyl fluoride, and vinylidene chloride, and
   (d) acid selected from the group consisting of 1-8% by weight of acrylic acid, 1-8% by weight of methacrylic acid, 4-8% by weight of maleic acid, and 4-8% by weight of itaconic acid,
and said dispersion is prepared by the process which comprises
   (A) adding to a mixture of water and solid particles of said interpolymer
      (a) 30-150 percent of the stoichiometric amount of ammonium hydroxide required to neutralize the acid present in said interpolymer and
      (b) when the second order transition temperature of the interpolymer is above 35° C., an amount up to 1 part per part by weight of said interpolymer, effective to render said interpolymer colloidally dispersible, of a liquid organic comminution agent which is capable of at least swelling the interpolymer particles and is inert toward the ammonium hydroxide, and
   (B) vigorously agitating the resulting mixture at a temperature of 40-100° C. until substantially 100 percent of the particles undergo a reduction in size and at least 95 percent by number of said particles have diameters of less than 0.1 micron.

2. The composition of claim 1 wherein the interpolymer consists essentially of methyl methacrylate, up to 75 percent by weight of said ester, and said acid, and has a weight average molecular weight of 10,000 to 150,000, said dispersion being prepared by first adding said comminution agent to the dispersion when the second order transition temperature of the interpolymer is above 35° C. and then adding the ammonium hydroxide to the dispersion.

3. The composition of claim 2 wherein the ammonium hydroxide is added to a white aqueous dispersion of said particles in water, there is no overlap in the size range of the particles before the comminution step as compared with the size range of the particles after the comminution step, at least 95 percent by number of said particles after the comminution step are within the size range of 0.1 to 0.01 micron in diameter, and a semi-transparent-to-clear colloidal dispersion is formed.

4. The composition of claim 3 wherein the interpolymer has a second order transition temperature above 25° C. and a comminution agent selected from the group consisting of alcohols, aldehydes, ketones, glycols and glycol ethers is added.

5. The composition of claim 4 wherein the acid is selected from the group consisting of 3-6 percent by weight of acrylic acid, 3-6 percent by weight of methacrylic acid, 4-6 percent by weight of maleic acid, and 4-6 percent by weight of itaconic acid.

6. The film-forming composition of claim 5 wherein the interpolymer has a second order transition temperature of at least 35° C. and the white aqueous dispersion is a latex.

7. The composition of claim 6 wherein said ester is ethyl acrylate.

8. The composition of claim 7 wherein 45 to 85 percent of the stoichiometric amount of ammonium hydroxide required to neutralize the acid present in the interpolymer is added.

9. The composition of claim 8 wherein the comminution agent is water miscible and has a boiling point of at least 100° C.

10. The composition of claim 9 wherein the interpolymer contains at least 50 percent by weight of methyl methacrylate.

References Cited

UNITED STATES PATENTS 3,057,812   10/1962   Straughan et al. __ 260—29.6 TA

FOREIGN PATENTS 973,568   10/1964   Great Britain ____ 260—29.6 TA

WILLIAM H. SHORT, Primary Examiner

L. M. PHYNES, Assistant Examiner

U.S. Cl. X.R.

260—8, 17 R, 29.6 H & ME, 30.4 R, 32.8 R, 32.2 R, 33.4 R, 41 B, 78.5 BB